United States Patent
Roberts

(10) Patent No.: US 8,926,432 B2
(45) Date of Patent: Jan. 6, 2015

(54) FEEDBACK CONTROLLER

(75) Inventor: Thomas J. Roberts, Alpine, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 410 days.

(21) Appl. No.: 11/874,662

(22) Filed: Oct. 18, 2007

(65) Prior Publication Data

US 2008/0227546 A1    Sep. 18, 2008

Related U.S. Application Data

(60) Provisional application No. 60/894,445, filed on Mar. 12, 2007.

(51) Int. Cl.
*A63F 13/02* (2006.01)
*A63F 13/20* (2014.01)

(52) U.S. Cl.
CPC ......... *A63F 13/06* (2013.01); *A63F 2300/1037* (2013.01); *A63F 2300/1012* (2013.01)
USPC .................... 463/37; 463/36; 463/38; 463/39

(58) Field of Classification Search
CPC ................ A63F 2300/1012; A63F 2300/1037
USPC .......................................................... 463/36
See application file for complete search history.

(56) References Cited

U.S. PATENT DOCUMENTS

| | | | |
|---|---|---|---|
| 4,302,011 A | 11/1981 | Pepper, Jr. | |
| 5,318,295 A | 6/1994 | Hofer | |
| 5,974,262 A | 10/1999 | Fuller et al. | |
| 6,645,076 B1 * | 11/2003 | Sugai | 463/30 |
| 7,654,901 B2 * | 2/2010 | Breving | 463/37 |
| 7,892,178 B1 * | 2/2011 | Bady et al. | 600/500 |
| 2003/0195040 A1 * | 10/2003 | Breving | 463/37 |
| 2003/0220142 A1 * | 11/2003 | Siegel | 463/37 |
| 2006/0116204 A1 * | 6/2006 | Chen et al. | 463/37 |
| 2006/0217598 A1 * | 9/2006 | Miyajima et al. | 600/300 |
| 2008/0220865 A1 * | 9/2008 | Hsu | 463/37 |

OTHER PUBLICATIONS

"Video game with shocking twist could prove hit," Jul. 30, 2001, Lubbock Avalanche-Journal, avaialable at http://lubbockonline.com/stories/073001/lif_0730010028.shtml, last accessed, Nov. 16, 2012.*

* cited by examiner

*Primary Examiner* — Jay Trent Liddle
(74) *Attorney, Agent, or Firm* — Sheppard Mullin Richter & Hampton LLP

(57) ABSTRACT

Systems and methods for providing various forms of feedback are provided and can be implemented in a system, for example, between a gamer and a gaming system. One or more embodiments might be included and directed toward providing feedback between a gamer and the gaming system by way of one or more various forms of controllers that might be used by a gamer in playing a game or in setting up or configuring the game. Various bio-feedback mechanisms might be implemented to provide feedback from the game controller to the game in response to the condition, state, or behavior or the user. For example, in one embodiment, heart rate monitors, temperature sensors, or other biological or physiological sensors can be included with, incorporated in or integrated into the controller to sense a gamer's biological or physiological sensors condition.

26 Claims, 6 Drawing Sheets

FEEDBACK CONTROLLER

CROSS-REFERENCE TO RELATED APPLICATIONS

This application claims the benefit of U.S. Provisional Application No. 60/894,445 filed Mar. 12, 2007, which is incorporated herein by reference in its entirety.

TECHNICAL FIELD

The present invention relates to bio-feedback or stimulus response, and more particularly, some embodiments relate to the use of bio-feedback or stimulus response with a controller mechanism for video or computer games.

DESCRIPTION OF THE RELATED ART

Interactive video games typically allow the user, or player, to provide some form of input to a game. This is commonly accomplished by the use of a controller of one form or another. In one example, a controller might be a hand-held controller that has input features such as a plurality of buttons, analog joysticks, D-pad directional control and other user input devices that provide a means for a gamer to input desired controls to the game software. Such user input would typically affect the game activity on the video screen.

For example, a typical controller for a PlayStation® or Xbox® gaming console might have buttons (for example X, O, Δ, □ or X, A, B, Y buttons); analog joysticks to control game piece movement; a four-way D-Pad; trigger buttons; and other miscellaneous input buttons. Pressure sensitive buttons and analog joysticks mean that an ADC (analog-to-digital converter) port for these controls can be added to allow appropriate response with minimal latency. As other examples, a controller might be configured as a joystick as is popular for flight simulator games, a steering wheel and pedal combination as is popular for driving games, and guitar or other musical instruments for interactive music-based games. As these examples illustrate, a controller for a gaming console or computer game might take on many diverse forms.

Until the advent of the popular PlayStation platform (circa 1996), feedback from video game play was generally limited to the visual and the audible. Players were provided information through the use of visual feedback via the display monitor and with various sounds. As technology has improved and processing speeds increased, the amount and quality of the audio and visual feedback has steadily improved. Additionally, video game interactivity has been enhanced by the addition of tactile feedback through the controller. It is now common for video game manufacturers to incorporate tactile feedback into game controllers. The most common form of physical feedback is vibration, also known as rumble, in the controller. Such vibration is often accomplished by providing motors with offset weighting on their shafts to provide a vibration or rumble sensation when the shaft is rotated. This might be triggered, for example, to make the controller rumble when a bomb is dropped, a car crashes, etc.

Tactile feedback is accomplished by having one or more built in motors inside of a game controller that spin an intentionally unbalanced weighted shaft. The vibration or rumble corresponds to an action in the game software or in the game set-up software. For example, in some fighting games, when a controlled game character is hit, the controller will vibrate. Or as another example, in a driving game, when a crash or car-to-car impact is experienced, the controller will vibrate. This type of vibration is known as 'passive' vibration, that is, it is accomplished by simply 'shaking' the controller. Game controller vibration can be tailored to offer specific tactile sensations that simulate the type or extent of activity occurring in the game.

Another form of tactile feedback, can be accomplished with servo-mechanisms. A series of motors built into a game controller, directly or indirectly through the use of drive belts or gears, are connected to a game controllers control surfaces to actively oppose physical input made by the gamer. This is known as force feedback, and requires more complex servo-mechanisms and controller design than does passive vibration feedback. For example, in a steering wheel controller, force feedback would require a servo mechanism attached to the shaft of the steering wheel. Upon certain electronic commands, for example, in a very high speed turn, the servo-mechanism would act to make the steering wheel physically more difficult to turn.

The various types of vibration or force feedback have become very common in modern day video games. However, for various reasons, gamers and game developers are looking for additional methods of physical feedback in order to maintain the current level of interactivity. Gamers are reluctant to modify their current handheld controller configuration. That is, they are comfortable with the current design of the hand-held controller, which by now has become intuitive and accepted by (indeed, institutionalized by) the video game industry. Indeed, vibration and force feedback mechanisms are all contained inside the common game controller housings. Typically, extraneous attachments are not successful in the marketplace, because it is a departure from the accepted game controller configurations.

BRIEF SUMMARY OF EMBODIMENTS OF THE INVENTION

According to various embodiments of the invention, various features and functions can be included with a gaming controller or other gaming appliance or peripheral device to enhance the gaming experience. For example, in one embodiment, the current invention can include for example, a means by which additional or alternative physical feedback sensations can be felt by the gamer. As a further example, a gaming controller can be configured to provide feedback to the user in the form of an electro-stimulus (i.e., an electric shock), in the form of temperature gradients, or otherwise. In another embodiment, the invention might be implemented to provide a mechanism by which bio-feedback from the gamer is sensed. For example, sensors or other mechanisms might be incorporated (for example, into the hand-hold portion of the controller) to sense biological, physiological or other factors or conditions such as, for example, the gamer's heart rate, the gamer's temperature, the level of sweat, the degree of pressure exerted on the grips, and so on. In yet another embodiment, additional audio or visual stimulus mechanisms can be incorporated into the controller such as, for example, a speaker or other audio transducer, and a monitor or display such as, for example, a small LCD panel attached to or incorporated in the controller.

In one embodiment, these functions might be implemented such that they can be experienced during game play with no other alterations to the standard and accepted game controller configuration. For example, heart rate monitoring and electro-stimulus might be accomplished by incorporating conductive form factored electrodes into the handles of a game controller. In one embodiment, electrodes might be created by coating the two controller handles with conductive material (e.g., electroplate) or by inserting some other electrically conductive material on the controller handle or handles, or on the joystick or at appropriate places on the wheel. Preferably, the conductors are provided in a form factored way so as to provide little or no difference in comfort and feel when a gamer is holding a game controller and playing a game.

As such, in one embodiment, electrodes can be provided at the touch surfaces of the game controller to sense the garners temperature, pulse or other biological or physiological factors, or to provide electro stimulus to the gamer. Modules (hardware or software or a combination thereof) can be provided within the controller by which the electronic stimulus is generated at the electrodes, as well as modules by which the heart rate is monitored through the electrodes. Also, the appropriate software drivers can be provided by which stimulus and feedback is communicated between the gaming application and the controller (for example, through the game system).

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to orientations such as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for providing various forms of feedback between a gamer and the gaming system. Particularly, one or more embodiments are directed toward providing feedback between the gamer and the gaming system by way of one or more various forms of controllers that might be used by a gamer in playing a game or in setting up or configuring the game.

Figure 1:
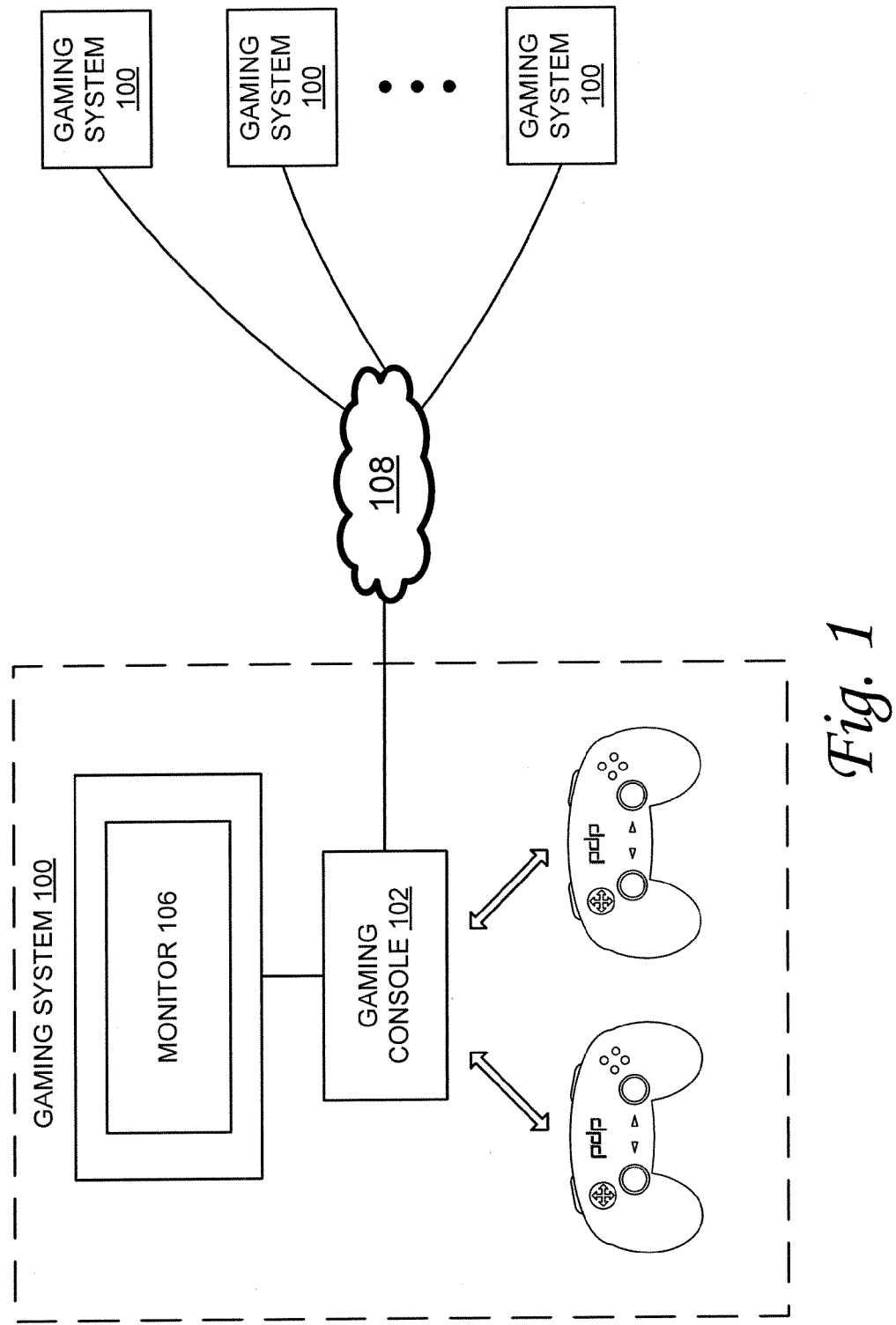
FIG. 1 is a block diagram illustrating a generalized version of a gaming system as one example of an environment with which the invention can be implemented.

Before describing the invention in detail it is useful to describe a few example environments with which the invention can be implemented. One such example is that of a gaming system used by one or more video game players, or gamers, to play computer games or video games. FIG. 1 is a block diagram illustrating a generalized version of a gaming system 100 as one example of an environment with which the invention can be implemented. Referring now to FIG. 1, the example gaming system includes a gaming console 102, a monitor 106, and gaming controllers 104. The illustrated example also includes an interface to a communication medium or communication network 108 such as, for example, the internet or other communication channel.

In one environment, gaming console 102 might be implemented as a PlayStation®, Xbox®, Wii™ or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software. In another environment, the gaming console 102 might be implemented as a personal computer.

A monitor 106 is typically provided to allow the gaming environment to display to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106.

Although not illustrated, speakers can also be provided, typically with monitor 106, to provide audible information to the gamer during game play and during set up. For example, in one embodiment, monitor 106 might be implemented as a television with built in speakers that is connected to the gaming console via a coaxial or other audio and video input.

Also illustrated in the example environment are gaming controllers 104 that can be used to allow gamers to provide input to the game software as well as to receive feedback from the game software during set up and game play. As described in the background section, controllers 104 can include, for example, X, Y, A, B buttons, trigger buttons, analog joysticks, key pads, and other devices to allow the user to provide input to the game. Thus by actuating the various buttons, switches or joysticks, the gamer can control the operation of the game or control characters or vehicles in the game. The interface between controllers 104 and gaming console 102 might be either wired and/or wireless interfaces as may be desired.

Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the internet or other communication medium whereby game information can be downloaded or uploaded to various websites, online services such as Xbox Live™, or other entities or services. Also, through a communication medium 108, gamers might compete amongst other gamers at their gaming systems 100, even if such other gamers at remote or distant locations. Note that depending on the gaming environment, remote gaming systems 100 might or might not have similar configurations to one another.

From time-to-time, the present invention is described herein in terms of this example environment. Description in terms of this example environment is provided to allow the various features and embodiments of the invention to be portrayed in the context of an exemplary application. After reading this description, it will become apparent to one of ordinary skill in the art how the invention can be implemented in different and alternative environments.

The present invention is directed toward systems and methods for providing various forms of feedback between a gamer and the gaming system. Particularly, one or more embodiments are directed toward providing feedback between the gamer and the gaming system by way of one or more various forms of controllers that might be used by a gamer in playing a game or in setting up or configuring the game. For example, various biofeedback mechanisms might be implemented to provide feedback from the game controller to the game in response to the condition, state, or behavior or the user. For example, in one embodiment, heart rate monitors, temperature sensors, pressure sensors, or other biological or physiological sensors can be included with, incorporated in or integrated into the controller to sense a gamer's biological and physiological condition. Appropriate circuitry or modules can be included to convert the biological or physiological condition into appropriate information that can be provided to the game and incorporated into the gaming experience.

Likewise, game information and game activity data can be used to generate feedback signals from the game or the game console to the controller to actuate various feedback mechanisms from the game to the gamer. For example, in one embodiment, an electro stimulus mechanism can be provided to reward or penalize the gamer with sensations such as an electrical shock, temperature or other tactile feedback, in accordance with various game events. For example, electrodes can be embedded into the portion of the controller that is contacted by the gamer to provide an electrical or other shock to the gamer in the event of or the occurrence of certain activities. As just one example, consider a situation where a gamer is playing a form of war game or battle game. Further consider scenario where the gamer might be shot or otherwise injured by opponents in the game. On the occurrence of such an event, the game might be configured to provide an appropriate signal to the controller to generate a shock to the user as a penalty or as a way of notifying the user that he or she has been shot or otherwise injured. As this simple example serves to illustrate, there are a number of scenarios, conditions or events that might be occurring during course of game play that may result in the game sending a signal to provide the electro stimulus feedback.

As other examples, Peltier or other thermo-electric devices might be provided with the controller to allow feedback, particularly tactile feedback, in the form of a temperature change. For example, the occurrence of certain events in the game might cause the controller, or contacts on the controller to heat or cool as a way of rewarding or penalizing the game based on game performance or game activity. Peltier devices, for example, can be configured to be biased so as to switch the feedback from a cooling stimulus to a heating stimulus.

As these simple examples serve to illustrate, a large number and variety of forms of tactical feedback might be provided. Preferably, of course, electro stimulus and temperature stimulus are controlled or limited in such a way so as to avoid injury to the player. Thus, while the feedback might be configured to vary or escalate depending on the circumstances of the game, limits can be built into the system to avoid an electro stimulus that might be too severe or temperatures above or below certain threshold ranges as may appropriately be established.

A number of different configurations might be provided to allow the various feedback mechanisms to be implemented. As discussed, in one embodiment the sensors, contacts, electrodes or other materials used to sense or provide the feedback might be incorporated into the controller at locations where the user would typically grip the controller. These are preferably formed in such a way to provide little or no change to the ergonomics of the controller or so as to provide a comfortable or ergonomic gripping surface and form factor. In one embodiment, as the above implies, these components are integrated into the controller such that the user experience is unchanged from conventional gaming interaction, other than the feedback or stimulus they provide.

In another embodiment, different form factors or configurations can be provided that deviate from conventional controller form factors or configurations. Additionally, separate modules, components or units can be provided in a unit that is physically separate from the controller. For example, electrodes or other contacts might be configured to be placed in contact with the player's wrist, chest or other areas. Such contacts can be provided with communications interfaces to allow them to be in communicative contact with controllers 104 or gaming console 102, for example.

In one embodiment, technology employed to implement electro stimulus feedback might be implemented based on transcutaneous electrical nerve stimulation technology, or TENS. In such an embodiment, an electro stimulus circuit can be provided. Such a circuit might include, for example, an oscillator or pulse generator, a transformer and a charge capacitor. The pulse generator can be configured to generate a pulse that is converted, for example, from low voltage battery power to a higher voltage, low current signal by the transformer. A charge capacitor can also be used. In one embodiment, the pulse generator can be formed using a simple oscillator with a fixed or variable frequency. For example, a frequency might be about 1 to 3 cycles per second, but could be higher or lower depending on the sensation desired.

A charge capacitor output can be used to change the output to direct current and store it in a capacitor. In one embodiment, low voltage CMOS circuitry can be provided to conserve power, and might be implemented using a choke in place of the transformer. As the above discussion suggests, conventional TENS circuits can be used. Of course, limits should be incorporated to avoid injury, harm, or unwanted levels of discomfort.

The operating frequency of the oscillator or oscillators, current levels and durations can be used to control the intensity and duration of the electrical stimulus. These might be controlled for example, in response to events or occurrences in the game such that varying levels or types of electro stimulus feedback are provided in response to various events in the game. For example, a gaming application may provide one level of intensity or duration of electrical stimulus in response to a given type of blow or injury sustained by the character of the gamer, and a more intense or longer duration stimulus in response to a more serious event. In one embodiment of the invention, as discussed above, conventional TENS technology can be used to provide the electrical stimulus. TENS technology is common in consumer markets and often is sold over the counter for therapeutic purposes. Similar technology can be used to generate the electrical stimulus provided as feedback to the gamer. Of course, there might be associated risks of abuse, tampering or other factors that could result in unwanted effects of the electrical stimulus. Additionally, a gamer or other participant would be advised to consult with a physician to ensure that unwanted side affects or harm would not occur. In terms of risk or danger that might be posed to the human body, such risks are usually discussed in terms of the amount of current that flows through the body. For example, the OSHA website lists certain levels of current and their effect on the human body as provided in Table 1

TABLE 1

| | |
|---|---|
| 1 milliampere | Tingle |
| 5 milliamperes | Slight shock felt; not painful but disturbing. Average individual can let go. Strong involuntary reactions can lead to other injuries. |
| 6-25 milliamperes (women) | Painful shock, loss of muscular control |
| 9-30 milliamperes (men) | Painful shock, loss of muscular control |

Given that the range of human body resistance is between 0.5 MOhm and 2 MOhms, at 75 Volts, the maximum current expected would be on the order of 150 microAmperes or 0.150 milliamps.

In spite of the low current flowing through the hands of the gamer, typical commercially available TENS units carry warnings. The warnings include: 1) not to be used with a pacemaker, 2) not to be used on the stomach when pregnant, 3) not be used on the face or mouth (although there is currently work being done on electro stimulating face lift apparatus). Such warnings, and any others as might be appropriate can be included with the controllers, console, game as well as manuals, documentation and packaging materials.

Figure 2:
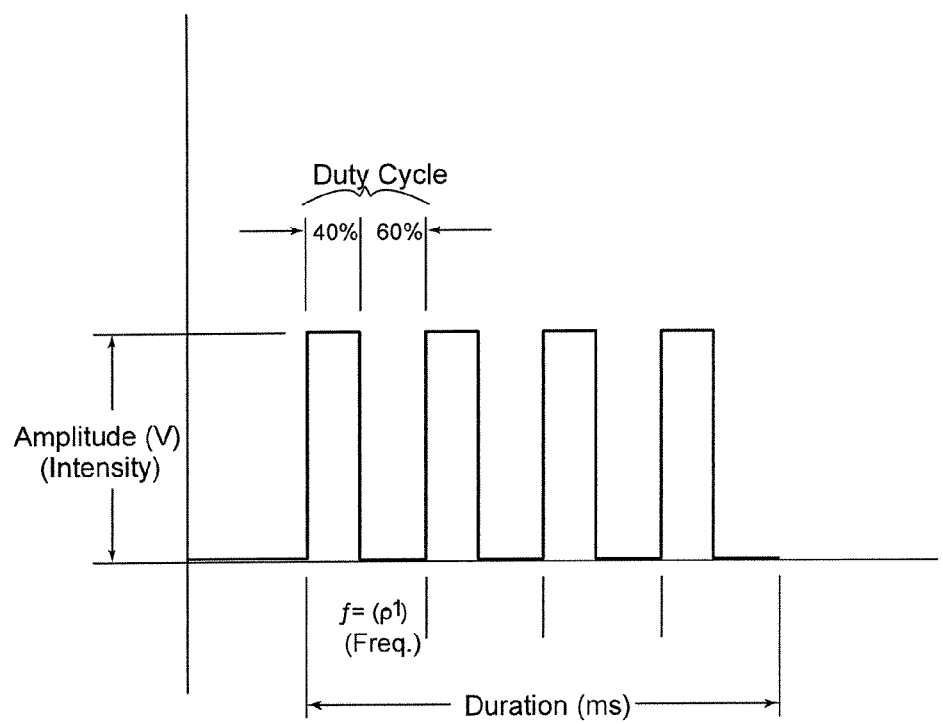
FIG. 2 is a diagram illustrating an example amplitude frequency and duty cycle of a bio-stimulus waveform in accordance with one embodiment of the invention.

FIG. 2 is a diagram illustrating an example amplitude frequency and duty cycle of a bio-stimulus waveform in accordance with one embodiment of the invention. Referring now to FIG. 2, the bio-stimulus waveform is approximated in this diagram is an example of an electro-stimulus waveform. This example illustrates input waveform characteristics that might be controlled by a controller or other stimulus module in accordance with one embodiment of the invention. This waveform is approximated as a square wave generated by a pulse generator. In one embodiment, the frequency is set at 70 Hz, and the duration of the stimulus is set at 10 to 50 milliseconds. In one embodiment, the duration can be configured as a continuously variable duration or configured to vary in a stepwise fashion. For example, in one embodiment, the duration might step from 10 to 50 milliseconds in 10 millisecond increments.

Likewise, the amplitude or intensity of the electro stimulus can be configured to be constant or variable, and variable intensity can be controlled in a stepwise or continuous fashion. For example, in one embodiment, the amplitude is set in a range of 45 to 62 volts in a step wise fashion. In one embodiment, five steps might be provided. As also illustrated in FIG. 2, the duty cycle of the example stimulus signal is 40%. This waveform illustrates only one example of a stimulus characteristic. Preferably, the stimulus characteristics are shapeable and configurable. The use of variable components and control mechanisms in a TENS circuit can result in a configurable stimulus characteristic that can vary in frequency, duration and amplitude.

Figure 3:
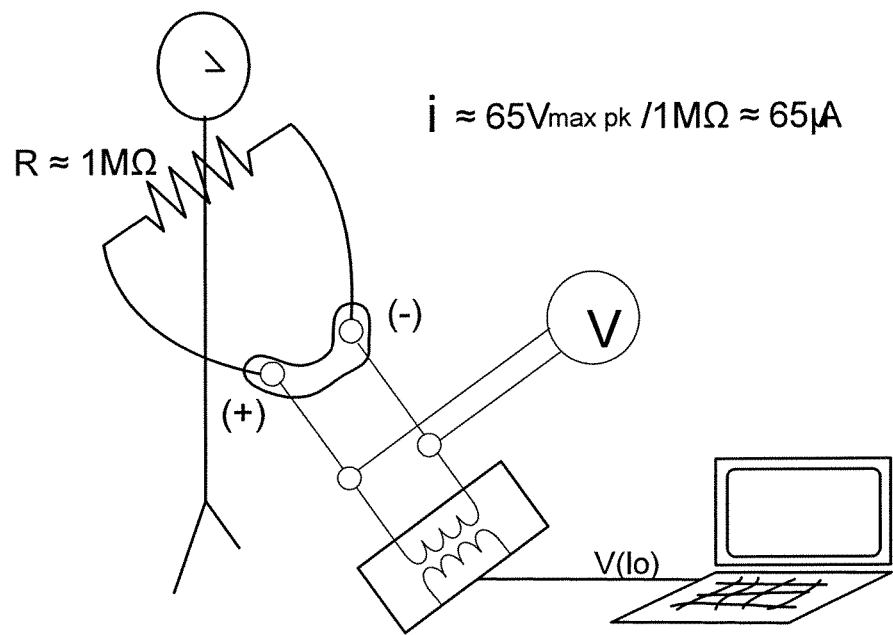
FIG. 3 is a diagram illustrating a rough equivalent circuit of an electro stimulus controller in accordance with one embodiment of the invention.

FIG. 3 is a diagram illustrating a rough equivalent circuit of an electro stimulus controller in accordance with one embodiment of the invention. As illustrated in FIG. 3, the human body is estimated in this case to provide a resistance between the electro stimulus electrodes 168 of approximately 0.5 to 1.5 Mohms. Assuming a maximum amplitude of 65 volts and a nominal 1 Mohm body resistance, the amount of current, i, flowing through the body would be approximately 65 microamperes. This is much less than the 1 milliampere stimulus outlined by the OSHA website. As an additional measure of relativity, a 9-volt battery placed on the tongue results in approximately 300 microamperes flowing through the tongue. TENS units are typically less than or equal to 500 microamperes. These are both greater than a 65 microampere maximum current. Of course, after reading this description, one of ordinary skill in the art would understand how changes in the configuration can be provided to increase or decrease the current levels, as well as how changes in a gamer's body resistance might impact the current levels.

As noted, another feature that might be provided in accordance with the invention is a bio-feedback feature to monitor, for example, one or more biological or physiological functions or status of the gamers. For example, in one embodiment, a heart rate monitor is used to measure the heart rate of a gamer participating in a gaming event. In one embodiment, the invention can be implemented to employ heart rate monitor technology that is similar to or identical to technology used in heart rate monitoring sensors for exercise equipment, home pulse rate monitors and the like. Additionally, in a more complex embodiment, an EKG or electrocardiogram like sensor arrangement can be used to trace the voltage generated by the cardiac or heart muscle during a heartbeat or a series of heartbeats.

Likewise, other biological or physiological characteristics can be sensed during game setup or game playing. For example, temperature sensors such as thermocouples can be used to sense the temperature of the gamer at the sensor location. For example, sensors placed at hand locations on a controller or otherwise attached to the gamer can sense the temperature of a gamer's hands or other body locations, and use this as a form of biofeedback to effect the game operation. Temperature absolute values as well as changes in temperature might be used to provide feedback to the game. Thus the game can be configured to incorporate temperature values and respond accordingly, or to look at temperature changes or trends and also respond. In one embodiment, the system might be configured to compare temperatures or temperature deltas to established baselines to determine how to react to this form of bio-feedback. Also, the system might be configured to factor out normal temperature changes such as the normal temperature increase that is expected when a user picks up a room-temperature controller and holds it for a period of time.

As another example, moisture sensors can be incorporated into the controller or other feedback mechanisms to provide feedback as to the level of sweatiness of the gamer's hands. Various different configurations of moisture sensors are well known in the art and can be incorporated into a controller or otherwise interfaced to the gaming environment to sense this biological or physiological condition of the gamers. In one embodiment, the system might be configured to compare moisture levels or deltas to established baselines to determine how to react to this form of bio-feedback. Also, the system might be configured to factor out normal moisture changes such as might occur when a user picks up a 'dry' controller.

As yet another example, pressure sensors can be incorporated into the controller or other feedback mechanisms to provide feedback as to the level of pressure or force a gamer is imparting on the sensors. Various different configurations of pressure sensors or transducers are well known in the art and can be incorporated into a controller or otherwise interfaced to the gaming environment to sense this condition.

In operation, these various forms of bio-feedback, alone or in combination, can be used to affect the gaming experience. For example, a gamer may be penalized in playing a game if he or she experiences an increased heart rate of other biological or physiological change. Because changes in biological or physiological function can impact the way that we perform or behave in real life situations, these changes might also be used by the invention to provide a more realistic gaming experience or add another element or dimension to the game. For example, consider a player in a given gaming environment who is not responding well to the pressure of the gaming outcome or adverse events that may transpire in the game. Such a player might experience an accelerated heart rate, sweaty palms, excessive blinking or other biological or physiological response. Such responses might be sensed by sensors and provided to the game to be used by the game to impact the game play.

For example, adverse biological or physiological responses (e.g., accelerated heart rate) might be used to increase the difficulty level of the to mimic real life adverse impacts of not responding well to stressful situations. As examples, a gamer may, in a gaming environment be penalized with slower system response times, faster depletion of energy levels or ammunition supplies, higher levels of detectability by opponents, increased sensitivity to attacks or blows or other injuries, greater difficulty in performing physically challenging or sensitive operations (such as loading an ammunition clip, for example), and so on. Of course, a game environment can be implemented where the converse is true and a gamer who responds to situations or events in a manner that reflects a cool or calm approach to the situation might be rewarded by his or her character being provided with increased stamina or energy, increased levels of weaponry, better performing machinery or controls, and so on.

Modern digital circuitry has sufficient power to filter and calculate the heart rate or other biological or physiological data to a degree of accuracy that can be useful to the game play environment. Digital data from a heart rate monitor or other biological or physiological sensor can be fed back to the game to impact how the game may be played. Given the fact that such a low voltage is present on the hands, a heart rate monitoring circuit is typically susceptible to electronic noise, thereby decreasing the accuracy of the heart rate reading. However, algorithms and filters which can process electronic signals in a fairly cost effective integrated circuit allow for "accurate enough" heart rate measurements.

Figure 4:
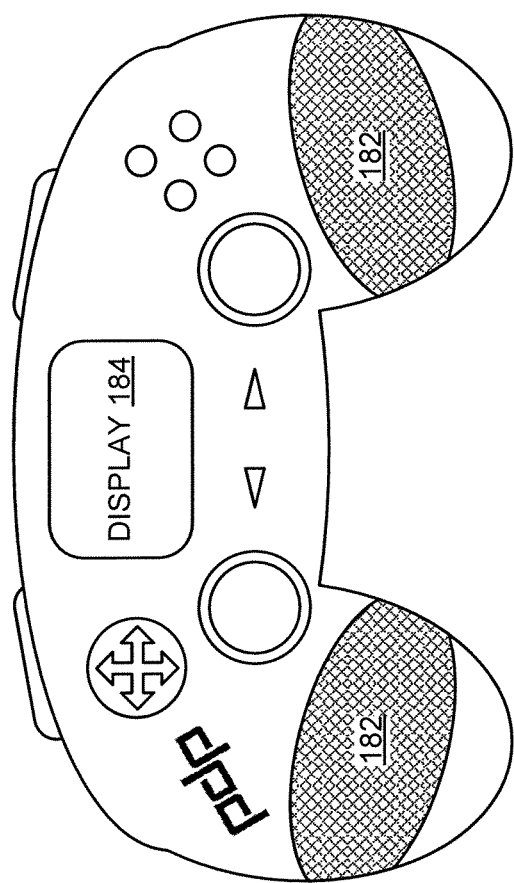
FIG. 4 is a diagram illustrating an example of controllers in accordance with one embodiment of the invention.

FIG. 4 is a diagram illustrating an example of controllers in accordance with one embodiment of the invention. In the example illustrated in FIG. 4, the controller includes a standard array of buttons, analog joy sticks, d-pads and triggers as might be commonly found in a conventional controller. Because such input mechanisms are well known in the art, they are not described further herein. Neither are reference numerals provided on the figure as these are such well known mechanisms. However, as noted elsewhere in this document, the invention can be configured to be implemented with a number of different controllers, devices, or video game peripherals, and this is merely one example.

Also illustrated in FIG. 4 are a plurality of electrodes or other contacts 182 that can be provided as feedback or stimulus mechanisms. Various configurations of contacts 182 can be provided depending on the stimulus or feedback desired. For example, a single contact 182, multiple contacts 182, two touch points on both hand, or through multiple touch points on both hands, etc. As a further example, a single contact 182 might be provided on each grip point of the controller, or multiple contacts might be provided on one or more grip points.

Additionally, various combinations of electrodes 182 might be implemented in a given application to provide multiple forms of stimulus or feedback. For example, for simple electrode stimulus to provide a shock to the user, one electrode at each grip point on the controller might be sufficient. To prevent cheating, contacts 182 are preferably placed at a location where it might be difficult or impossible to operate the controller without touching or otherwise contacting them. Thus, electrode placement may vary or be driven by controller shape. Also, it might be affected by configuration of a controller for a particular game. Likewise, controller configuration might itself be dictated by a game that uses feedback. For example, a set of particular controller configurations might be dictated by the game to force the gamer to use buttons that might minimize his or her ability to avoid contact with the electrodes. Similarly, the flexibility of reconfiguring the controller might be somewhat limited by the game to minimize the ability of a user to cheat the system by avoiding contact with the electrodes.

Although contacts 182 are illustrated as being on the topside of the handles of the controller, this is merely done for ease of illustration. As one of ordinary skill in the art would appreciate after reading this description, contacts 182, might be placed at other locations as appropriate. Of course, with other types or shapes of controllers, other locations, shapes and sizes of contacts might be appropriate to allow proper contact.

Similarly, other locations, shapes and sizes might be appropriately considered to meet design goals that might be important such as, for example, ergonomics and aesthetics, as well as to provide sufficient contact to ensure a proper functionality and to minimize the opportunity for cheating.

As noted, in one embodiment, electrode placement might be dictated to minimize the opportunity for a gamer to cheat. In another environment, contacts 182 or additional sensors can be provided to detect the presence of a gamer's hand on the appropriate portions of the controller. Thus, the game might be configured to sense and require proper placement of the hands in order to enable game operation. Thus, the game might be configured to disable operation, penalize the gamer, kill or injure the gamer's character, or take other action if the gamer does not have his or her hands placed properly on the controller so as to enable the stimulus or feedback modes. Such sensors might also be configured for reaction by the controller and might be, for example, configured to disable the controller or otherwise effect the operation of the controller if the hands are not properly placed.

In another embodiment, the electrodes can be integrated or combined with switches such that properly gripping the controller and electrodes actuates the switches in an ergonomic fashion. Thus, if the controller is not properly gripped, the switches are not actuated and the controller or the game can detect improper use of the controller. Preferably, such switches would be provided in a place that they are actuated based on normal gripping operations of the controller so as to not require additional manipulation by the user which might otherwise interfere with gaming operations at the controller.

The embodiment illustrated in FIG. 4 also includes an auxiliary display 184 that might be included with the controller to provide additional features to the gamer. For example, an LCD or other small display device, whether color or black and white, or whether graphical or textual, can be provided to enhance the gaming experience. Such a display might be configured as a plug-in or a flip-up display or it might be integrated with the controller in a fixed configuration. Such a display might be provided to furnish additional information to the user during the gaming experience. For example, for sports games where users are required to scroll through and select play options for example, such play options might be configured to be displayed on auxiliary screen 184 rather than on gaming monitor 106. As such, the gamer's confirmation of scrolling through menus and selecting plays can better be hidden from his or her opponents.

As another example, display 184 might be used to provide other auxiliary display features to the user in addition to those displayed on monitor 106. For example, in a driving game or flight simulator, display 184 might be used to provide additional information about the vehicle or aircraft that the gamer is operating. Thus, additional information can be provided to the gamer without cluttering the main gaming display 106, or allow another gamer to see the displayed information in multi-player games. Instruments, gauges, maps and other readouts are examples of items that can be displayed in auxiliary display 184.

In one embodiment, the material that is displayed on auxiliary display 184 might be soft selectable by the gamer. For example, this might be done as a part of controller configuration. Alternatively, switches on the controller might be used to allow the gamer to toggle through display modes or screens in real time during gaming operations. Thus, through controller setup or perhaps through the proper actuation of buttons or switches, the user can be provided with the ability to configure auxiliary display 184 to display the content that he or she might desire during gaming operations.

Figure 5:
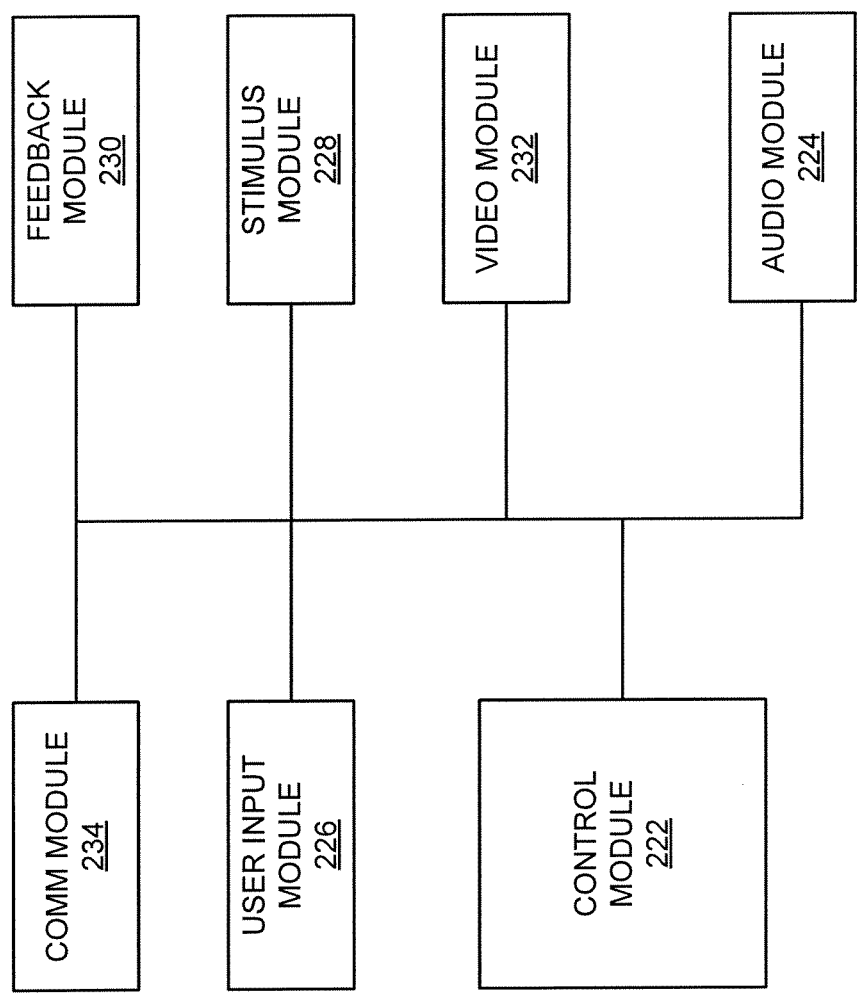
FIG. 5 is a diagram illustrating an example functional block diagram of a controller in accordance with one embodiment of the invention.

FIG. 5 is a diagram illustrating an example functional block diagram of a controller in accordance with one embodiment of the invention. Referring now to FIG. 5, the example controller includes a control module 222, an audio module 224, an input module 226, a stimulus module 228, a biosensor module 230 and an auxiliary display module 232. Also a communication interface module 234 is provided to enable communication between the controller and other units, such as, for example, gaming console 102. One or more biosensor modules 230 might be provided to receive data from the biological or physiological sensors and, either alone or in combination with control module 222, convert those signals into appropriate data representations that can be properly interpreted by the game application or game driver to sense the biofeedback and operate on it accordingly. For example, a heart rate signal might be converted into an 8 bit PCM data stream that can be sent to the game application by way of communication interface module 234.

Stimulus module 228 can be provided to provide the appropriate signals to drive electrodes or other contacts 182 that might be installed to provide the desired stimulus. For example, stimulus module 228 might be comprised for a TENS circuit driven by the game to provide the appropriate levels of current to the electrodes to provide the electro stimulus. Likewise, stimulus module 228 might be implemented as selectable drivers to provide the appropriate current in the desired polarity to Peltier devices to adjust the temperature that is experienced by the game while playing the game.

User input module 226 can be implemented to include appropriate receivers, analog-to-digital converters to accept user input at the keypads, joysticks and other switches. Auxiliary display module 232 can include the appropriate converters and drivers to provide a still or motion image signal to auxiliary display 184. Auxiliary display module 232 might also be used to provide soft or hard menus and cursors to allow setup selection for game or controller operations locally to the controller. Thus, for example, the display module might be used to allow the gamer to reprogram or reconfigure the controller independently of a gaming application.

Likewise, audio module 224 can provide the appropriate audio amplifier or drivers to provide a signal to a speaker or supplemental audio. A control module 222 can be provided to control various operations of the controller. For example, a processor or processors system can be provided to control the various operations of controller 104.

Figure 6:
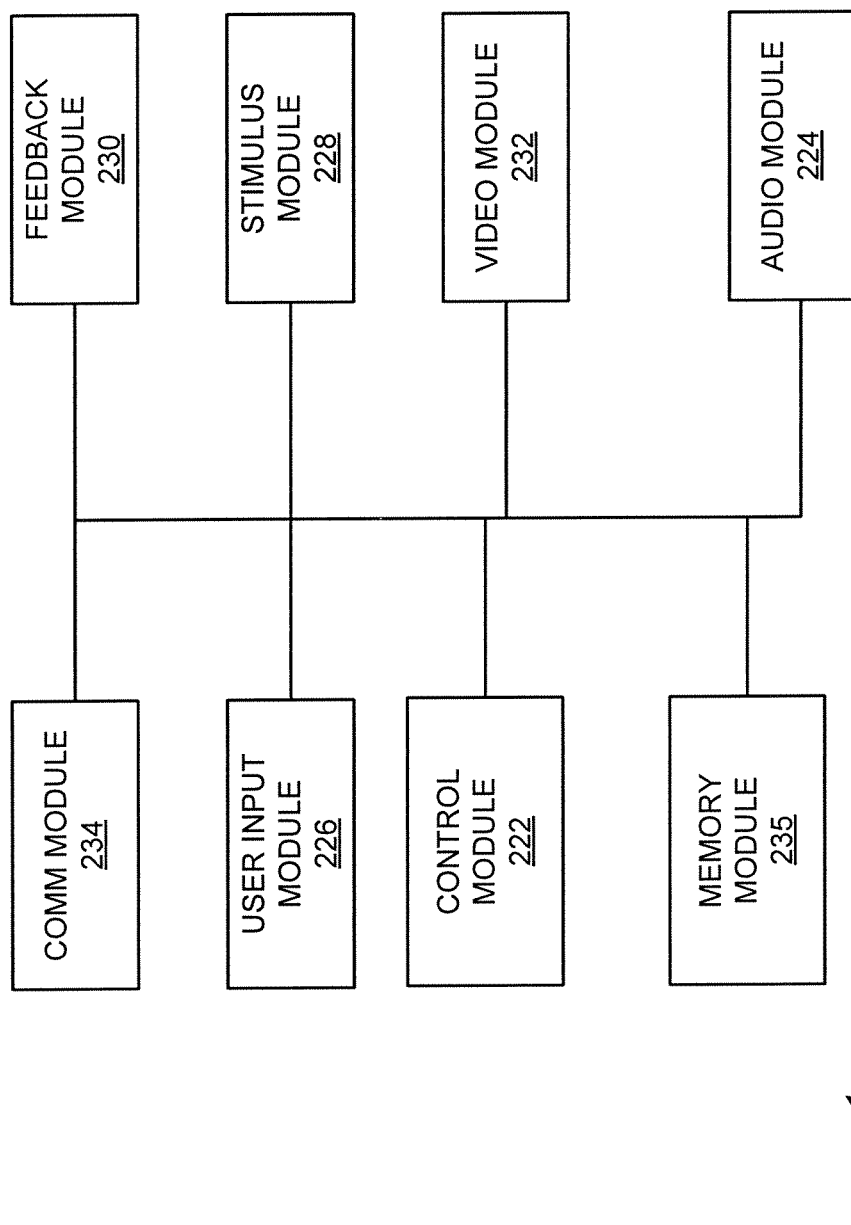
FIG. 6 is a diagram illustration an example functional block diagram of a controller in accordance with one embodiment of the invention.

FIG. 6 is a diagram illustrating an example functional block diagram of a controller 600 in accordance with one embodiment of the invention. Referring now to FIG. 6, controller 600 is similar to the controller of FIG. 5 but with the addition of a memory module 235. In one embodiment, memory module 235 may contain predetermined stimulus responses for certain bio data gathered by biosensor module 230 and user's input. In this way, controller 600 can immediately produce a stimulus based on a user's input or based on a bio-feedback data collected by biosensor module 230 without having to wait for instructions from the game console. For example, in one embodiment, one or more of user input module 226, stimulus module 228, biosensor module 230, and memory module 230 may work in conjunction with one another to monitor a user's input or heart rate and produce a stimulus such as, for example, an electric shock or a change of temperature on controller 600 when a user press a certain button such as Y, for example, or when the user's heart rate exceeds a certain threshold. For example, in a game environment, a user may perform a special move by pressing a series of buttons, thus if the input from the activation of the series of buttons matches with a profile in memory module 230, an electric shock or other stimulus can be produced by stimulus module 228.

In one embodiment, memory module 235 can be uploaded with a "stimulus vs. user input" and "stimulus vs. bio-feedback data" definition tables by game console 102 at the start of a game for example. A combination of stimulus vs. input and biofeedback table could also be used. In this way, controller 600 can deliver the proper stimulus without having to wait for instruction from game console 102. Controller 600 can be configured to provide stimulus based on information stored in memory module 235 or based on instructions from game console 102, or a combination of both.

As used herein, the term module is used to describe a given unit of functionality that can be performed in accordance with one or more embodiments of the present invention. As used herein, a module can be implemented utilizing any form of hardware, software, or a combination thereof. In implementation, the various modules described herein can be implemented as discrete modules or the functions and features described can be shared in part or in total among one or more modules. In other words, as would be apparent to one of ordinary skill in the art after reading this description, the various features and functionality described herein may be implemented in any given application can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A game controller comprising:
    a communication interface configured to communicate with an interactive video game console, wherein the interactive video game console is configured to provide a game play that changes based on a biological condition of a user of the game controller;
    a user input module configured to send an instruction to the interactive video game console via the communication interface;
    a biosensor module configured to sense the biological condition of the user of the game controller and to send information representative of the biological condition to the interactive video game console via the communication interface to alter a game parameter during the game play based on the biological condition of the user;
    a memory module configured to store a stimulus-biological condition relationship table that matches a tactile stimulus to the sensed biological condition of the user; and
    a stimulus module configured to apply a tactile stimulus to the user of the game controller based on the relationship table without having to wait for instructions from the interactive video game console.

2. The game controller of claim 1, wherein the biosensor module comprises a plurality of electrodes.

3. The game controller of claim 2, wherein the representative biological information comprises a heart rate or a temperature of the user of the game controller.

4. The game controller of claim 2, wherein the representative biological information comprises an amount of pressure the user of the game controller is exerting on the biosensor module.

5. The game controller of claim 1, wherein the biosensor module comprises a moisture sensor.

6. The game controller of claim 1, further comprising a speaker, wherein the stimulus module is further configured to produce a sound via the speaker based on the relationship table.

7. The game controller of claim 1, wherein the tactile stimulus is an electric shock or a change of temperature.

8. The game controller of claim 1, wherein a magnitude of the tactile stimulus is varied.

9. The game controller of claim 1, further comprising a display screen.

10. The game controller of claim 1, wherein the memory module is uploaded with the stimulus-biological condition relationship table at the start of a game.

11. The game controller of claim 10, wherein the stimulus module is configured to apply a sensory feedback to the user if the user's heart rate exceeds a predetermined threshold uploaded with the stimulus-biological condition relationship table at the start of the game.

12. An interactive system comprising:
an interactive video game console configured to provide a game play to a user via a monitor; and
a game controller comprising:
a communication interface configured to communicate with the interactive video game console;
a biosensor module configured to sense a biological condition of a user of the game controller and to send information of the biological condition to the interactive video game console via the communication interface to alter a game parameter during the game play based on the biological condition of the user;
a memory module configured to store a stimulus-biological condition relationship table that matches a tactile stimulus to the sensed biological condition of the user; and
a stimulus module configured to apply a tactile stimulus to the user of the game controller based on the relationship table without having to wait for instructions from the interactive video game console.

13. The interactive system of claim 12, wherein the biosensor module comprises a plurality of electrodes.

14. The interactive system of claim 12, wherein the information of the biological condition comprises a heart rate, a grip pressure, a temperature, or moisture information of the user of the game controller.

15. A game controller comprising:
an interface configured to communicate with an interactive video game console, wherein the interactive video game console is configured to provide a game play that changes based on a biological condition of a user of the game controller;
a biosensor module configured to collect information on a biological condition of a user of the game controller and to send the information to the interactive video game console via the user interface to alter a game parameter during the game play based on the biological condition of the user;
a memory module configured to store a stimulus-biological condition relationship table that matches a tactile stimulus to the collected biological condition of the user; and
a stimulus module configured to apply a tactile stimulus to the user of the game controller based on the relationship table without having to wait for instructions from the interactive video game console.

16. The game controller of claim 15, wherein the stimulus module further receives instruction from a memory module, wherein instructions from the interactive video game console are stored.

17. The game controller of claim 15, wherein the information comprises a heart rate, a grip pressure, a temperature, or a moisture information of the user of the game controller.

18. The game controller of claim 15, wherein the tactile stimulus sensory feedback is an electric shock or a change of temperature.

19. The game controller of claim 15, wherein a magnitude of the tactile stimulus is varied.

20. The game controller of claim 15, wherein the biosensor module is a heart rate monitor, a pressure sensor, or a temperature sensor.

21. A game controller comprising:
a communication interface configured to communicate with an interactive video game console, wherein the interactive video game console is configured to provide a game play that changes based on a biological condition of a user of the game controller;
a biosensor module configured to collect information on the biological condition of the user of the game controller;
a memory module for storing a stimulus-biological condition relationship table that matches a tactile stimulus to the collected biological condition of the user; and
a stimulus module configured to produce a tactile stimulus based on the relationship table without having to wait for instructions from the interactive video game console.

22. The game controller of claim 21, further comprising:
a user input module configured to collect a user input from the user, wherein the stimulus module is configured to produce a second tactile stimulus based on the user input.

23. The game controller of claim 22, wherein the stimulus module is configured to produce a second tactile stimulus based on the user input without having to wait for instructions from the game console.

24. The game controller of claim 23, wherein the stimulus module is configured to produce a second tactile stimulus independent of what happens in a game played on the game console.

25. The game controller of claim 23, wherein the stimulus module is configured to produce a second tactile stimulus if the user input matches a series of button inputs.

26. The game controller of claim 21, further comprising a speaker, wherein the stimulus module is further configured to produce a sound via the speaker based on the relationship table.

* * * * *